N. Atherton.
Steam-Engine.
N° 76139. Patented Mar. 31, 1868.
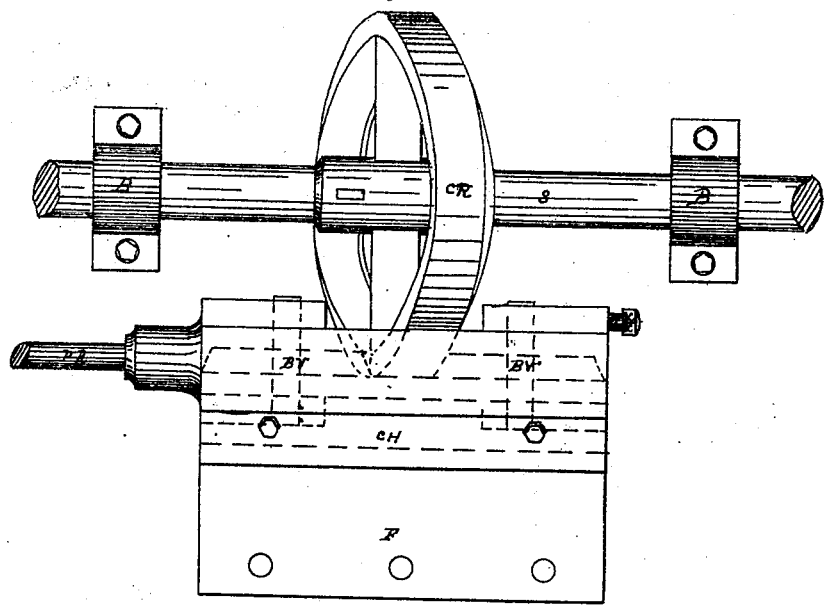
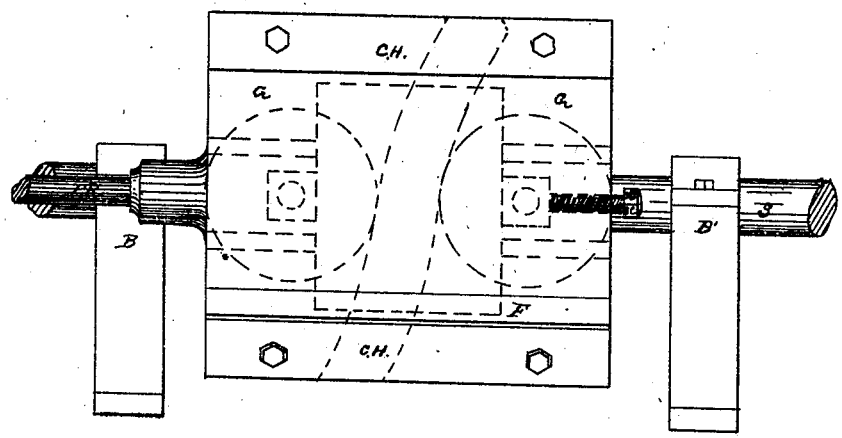
Witnesses,
Isaac R. Oakford
Alvin C. Bell Jr.
Inventor,
Nathan Atherton
per Charles H. Evans
Attorney N. Atherton.
Steam-Engine.
N° 76139  Patented Mar. 31, 1868.
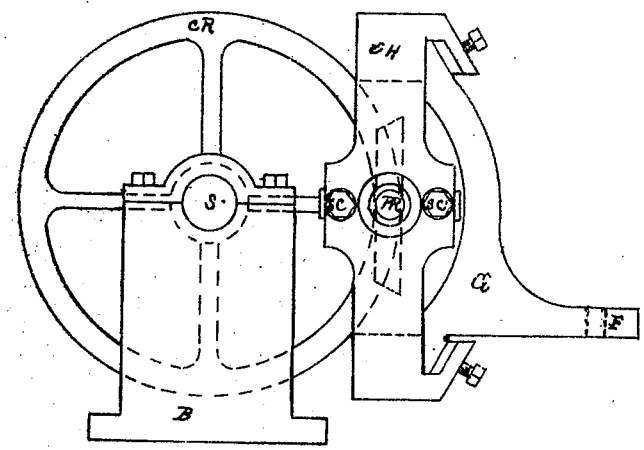
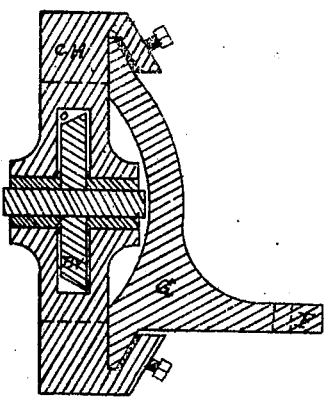
Witnesses.
Inventor

United States Patent Office.

NATHAN ATHERTON, OF PHILADELPHIA, PENNSYLVANIA.

*Letters Patent No. 76,139, dated March 31, 1868.*

IMPROVEMENT IN STEAM-ENGINES.

*The Schedule referred to in these Letters Patent and making part of the same.*

TO ALL WHOM IT MAY CONCERN:

Be it known that I, NATHAN ATHERTON, of the city of Philadelphia, county of Philadelphia, and State of Pennsylvania, have invented a new and useful Improvement in Steam-Engines; and I do hereby declare that the following is a full, clear, and exact description of the construction and operation of the same, reference being had to the accompanying drawings, making a part of this specification, in which—

Plate 1, Figure 1, is a top view of my improved motion for steam-engines.

Plate 1, Figure 2, is a side view of same.

Plate 2, Figure 3, is an end view of same.

Plate 2, Figure 4, is a section through the cross-head and guide.

The object of my invention is to produce a substitute for the crank used in steam-engines, by which means I overcome friction, gain power, and save fuel; also, by the combination of two or more cylinders, I am enabled to produce a continuous motion at right angles.

To enable others skilled in the art to make and use my invention, I will now proceed to describe its construction and operation.

S is the main shaft, running parallel with the cylinder, and working in bearings B and B', which are placed at proper distance to give steadiness to the shaft. Between the bearings B and B' is mounted a curved ring, C R, made with any number of elevations desired, although three have been found to work to the best advantage. Curved ring C R is connected by arms to central hub on the shaft S.

C H is the cross-head, and made in the shape as shown in fig. 3, and having an opening, O, fig. 4, in the centre, in which are placed two bevelled wheels, B V and B V', the said wheels having their centre on a line with the main shaft S. The axles of the wheels B V and B V' work in brass bearings.

S C and S C', fig. 3, are set-screws, for the purpose of adjusting the brasses in the bearings of B V'. The rim or curved part of the ring C R passes between the two bevelled wheels B V and B V', part of the cross-head C H being cut out to allow it (ring C R) to pass through.

The bevel of the wheels B V and B V' is made to suit the bevel on ring C R, which in this case assumes the position of an inclined plane, and the wheels B V and B V' roll around on it, and turn in the same direction on the in-and-out stroke of the piston, wheels B V and B V' being adjusted so as to have freedom of motion; they also take up all friction; hence I am enabled to produce a smooth motion free from all friction and jar, so susceptible in engines of ordinary construction. The bevelled wheels B V and B V' are so arranged in reference to the curved ring C R, that the point of contact is on a line drawn through the centre of the piston-rod P R and cross-head C H.

G, fig. 3, is an upright guide, with its upper and lower edges bevelled, on which works the cross-head C H. Guide G is bolted to the bed-plate of the engine by means of the flange F. On the end and centre of the cross-head C H, a round boss is cast, into which the end of the piston-rod P R is screwed or keyed.

When more than one engine is used, it is necessary to put the motion not parallel, but above or below the centre, thus producing full power of one engine continuously, so that when one engine is in full power, the other is passing the blending of the curve, and *vice versa*.

Having thus described my invention, its construction and operation, what I claim, and desire to secure by Letters Patent of the United States, is—

The curved ring C R, bevelled wheels B V and B V', cross-head C H, guide G, and piston-rod P R, all arranged as herein described, for the purpose of changing reciprocating motion into rotary, and producing a continuous motion at right angles, and overcoming friction.

NATHAN ATHERTON.

Witnesses:
CHARLES H. EVANS,
ISAAC R. OAKFORD.